// United States Patent [15] 3,672,152
Reefman [45] June 27, 1972

[54] ELECTROMECHANICAL OSCILLATOR

[72] Inventor: William E. Reefman, Santa Barbara, Calif.
[73] Assignee: The Bunker-Ramo Corporation, Oak Brook, Ill.

[22] Filed: June 17, 1970
[21] Appl. No.: 46,926

[52] U.S. Cl. ....58/23 V, 310/25, 310/37, 331/116
[51] Int. Cl. ....G04c 3/02, H02k 7/06
[58] Field of Search ....58/23 AC, 23 TF, 23 V, 28; 310/25, 36, 37; 331/116, 154; 74/21, 84

[56] References Cited

UNITED STATES PATENTS

| | | | |
|---|---|---|---|
| 3,277,394 | 10/1966 | Holt et al. | 331/116 |
| 3,225,226 | 12/1965 | Kawakami | 310/8.6 |

*Primary Examiner*—Richard B. Wilkinson
*Assistant Examiner*—Edith C. Simmons
*Attorney*—Frederick M. Arbuckle

[57] ABSTRACT

A ring-shaped pendulum is supported on a base by crossed flat spring flexure members which permit limited rotational movement of the pendulum. Each flexure member is supported at one end by the base and is connected to the pendulum at the opposite end. Piezoelectric elements, either laminated to flexure members or coupled to them by drive rods, cause oscillation of the pendulum upon application to the elements of an electrical signal at a frequency approximately the same as the natural frequency of the suspended system or in multiple relation thereto. Through a spring-pressed pawl attached to the pendulum, the oscillating movement of the latter actuates a ratchet wheel, which drives a gear train.

A variant form is self-energized. A piezoelectric element on one flexure member provides an input signal to an amplifier. The output from the amplifier is used to drive a piezoelectric element on another flexure member, thus maintaining the suspended system in oscillation.

10 Claims, 9 Drawing Figures

ELECTROMECHANICAL OSCILLATOR

RELATED APPLICATIONS

A commonly-assigned co-pending application, Ser. No. 875,428, filed Nov. 10, 1969, discloses amplifier circuits particularly applicable to operation of an oscillator such as is described herein.

BACKGROUND OF THE INVENTION

The invention relates to oscillating systems of the kind usable in time-keeping devices, and similar apparatus.

Broadly speaking, the rotary pendulum is well known, being found as the balance wheel in spring wound watches and clocks. In such devices, the balance wheel, in conjunction with the hair spring, constitutes a rotary oscillating system having a natural frequency or periodicity. The constancy of the period is one of the major factors affecting time-keeping accuracy.

In devices of the prior art, the rotary pendulum is mounted in mechanical bearings, sometimes with the metal pivot in a metal plate, or in better grade mechanisms, with the metal pivot in a jeweled bearing. Whatever the type of bearing used, there are undesirable variations in the periodicity of the system because of the uncontrollable factors of wear, lubrication, dirt and vibration which affect the bearing interfaces, and change the friction losses The present invention avoids the disadvantages described, inasmuch as pivotal movement of the rotary pendulum about its central axis is provided by the flexing of springs. Consequently, there is no rubbing friction, no wear, no requirement for lubrication, and no hazard from dirt or foreign matter. In addition, the elimination of rubbing friction at the pivot point enables the system to have very low losses.

The balance wheel of conventional devices is limited in size because of its relation to the rest of the mechanism. In the present invention, the rotary pendulum may be nearly as large as the entire timepiece, because it can enclose most of the other necessary elements.

Where a clock system is battery operated, as in an automobile, it is generally desirable to have an oscillating system in which the losses are relatively low, so that it involves a minimum of drain on the battery. Low losses make possible a mechanically resonant system having a high Q. Such a system, in addition to dissipating a minimum of power, also acts as a filter in the sense that to a high degree it isolates the time-keeping system from the effect of extraneous signals of either a mechanical or an electrical nature. This, too, is advantageous in an automobile, where the conditions of vibrations and shock tend to be destructive for conventional time-keeping devices.

SUMMARY OF THE INVENTION

This invention provides, as a suspension for a rotationally oscillatable member, a plurality of elongated flexure members, each supported at one end with respect to a base, and connected at the other end to the oscillatable member. The flexure members all pass approximately through the axis of rotation of the oscillatable member. The suspension in effect gives a pivot with no rubbing friction, which permits limited rotational movement and provides a restoring force. Motion about the center is thus provided, with work losses which are confined to the molecular friction of the material of the flexure members, and to any air drag on the moving parts. These factors are quite small, and test configurations embodying the invention have demonstrated unloaded Q values greater than 1,000.

Energy input is provided by drive means through which force impulses are applied at correct intervals to cause oscillation at or near the natural frequency of the suspended system.

The system may be driven by electromagnetic or piezoelectric elements acting upon the moving parts, the elements being energized by electrical signals of appropriate frequency generated in an external source, having its own frequency control.

Alternatively, the drive elements may be actuated by pulses from an amplifier which in turn has its input controlled by the signal from a pickup energized by movement of one of the moving parts. The system is thus self-excited, with the natural period of the suspended mechanism as the major frequency-determining factor.

The system may be utilized for a mechanical output, for example, as a drive for a clock, in which the time-keeping accuracy of the clock is largely determined by the frequency stability of the electromechanical oscillating system.

The invention may also be utilized where the controlled frequency output of the drive amplifier is the matter of principal interest, and the mechanical stability of the rotary pendulum system provides desired constancy in the output signal.

An advantage of the invention is that it permits design of the moving system in a way which can maintain the resonant frequency relatively constant through a considerable range of temperature variation. This is another feature very desirable in automobile clocks, which may experience extreme changes in ambient temperature. Automobile manufacturers' specifications for clocks may require operation in exposures from −20° to +160°F.

These and other advantages will be apparent in the following detailed description.

DESCRIPTION OF THE PREFERRED EMBODIMENTS

Figures 1, 2, 3, 4, 5:
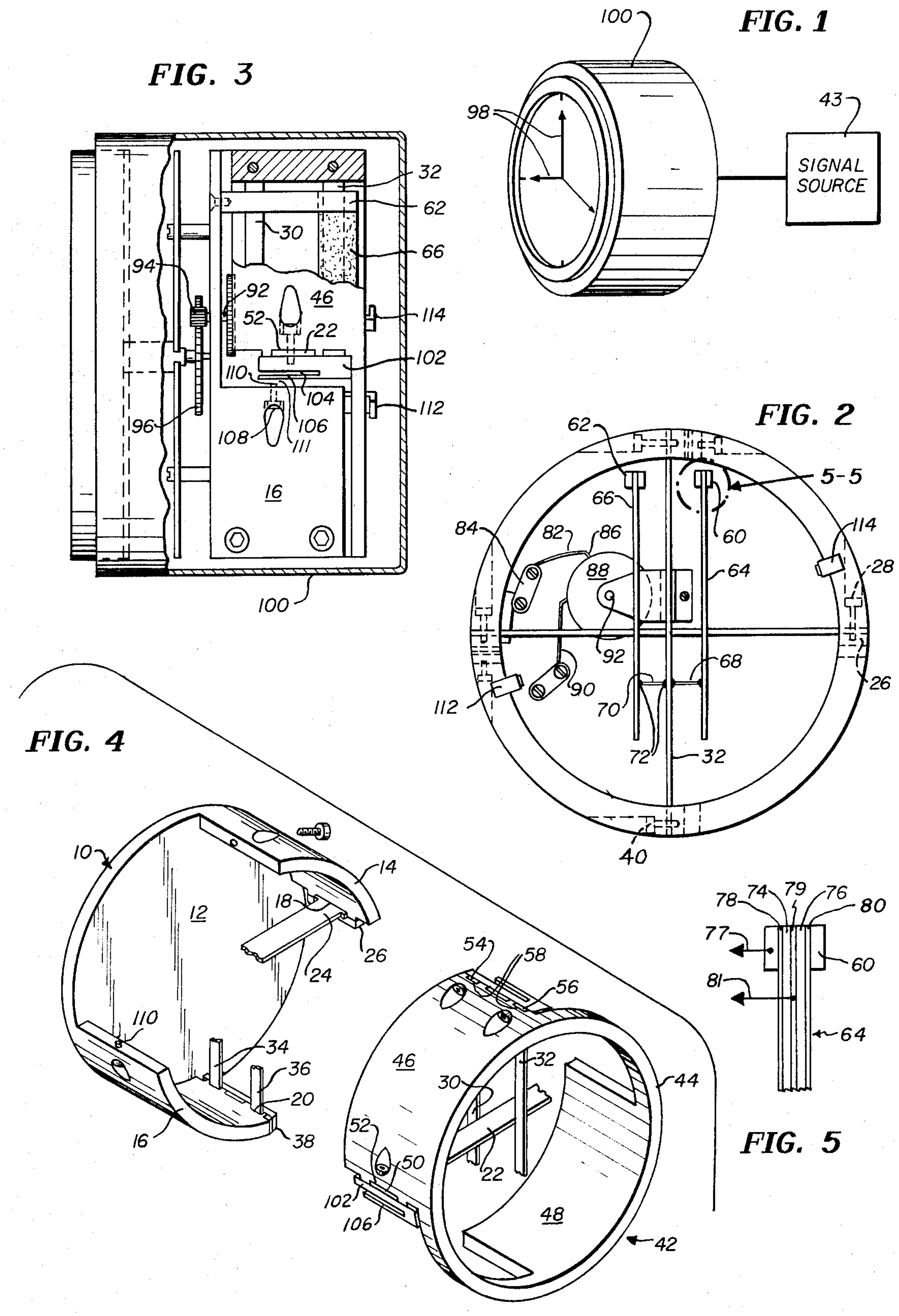
FIG. 1 is a diagrammatic illustration showing in perspective a clock embodying this invention with a conventionalized representation of the amplifier or other signal source used to drive it.
FIG. 2 is an elevation view of an oscillating system embodying the features of the present invention.
FIG. 3 is a side view, partly in section, of the device shown in FIG. 2.
FIG. 4 is a perspective view showing certain of the parts of FIGS. 2 and 3 in exploded relation.
FIG. 5 is an enlarged detail of the portion of FIG. 2 within the lines 5—5 of FIG. 2.

The form of the invention represented in FIGS. 1 to 5 can perhaps best be understood by initial reference to FIG. 4. In this exploded view a base is indicated generally by the numeral 10. It includes a flat disk portion 12 and wall portions 14 and 16 which have the conformation of parts of a cylinder. The wall portions extend circumferentially for alternate quarter segments of the circumference. The wall portion 14 has a mounting face 18 and the wall portion 16 has a mounting face 20, each of these faces lying substantially in an axial plane. A flat spring flexure member 22 is fastened at its end 24 to the mounting face 18, being retained thereagainst by a clamp plate 26 (shown dotted in FIG. 2) held by a screw 28 passing through the wall portion 14. Similarly, two spring flexure members 30 and 32 have their ends 34 and 36 attached to the face 20 by a clamp plate 38 and a screw 40. The three spring flexure members serve as a support for a rotationally oscillatable member which will be referred to generally herein as the pendulum 42. It consists of an annular portion 44 carrying two wall portions 46 and 48 adapted to fit in the circumferential gaps between the wall portions 14 and 16 of the base 10. Support for the pendulum 42 is provided by attaching the end 50 of spring member 22 to the face 52 of the wall portion 46 of the pendulum and the ends 54 and 56 of the spring members 30 and 32 respectively to the mounting face 58 of the wall portion 46.

The longitudinal stiffness of the three spring members, together with the arrangement whereby the member 22 is substantially at right angles to members 30 and 32, maintains the pendulum 42 substantially centered with respect to the base 10. In a cross-section taken transverse to the longitudinal dimension of a spring member such as 22, the long dimension of the section is in an axial direction, whereas the thin dimension of the section is perpendicular to the mounting face, in this case to the face 18 or the face 52. The result is considerable stiffness in the axial direction, which holds the parts in coaxial relation but there is relative freedom to flex in the direction of the thin dimension of the spring. Such flexure permits limited rotational movement of the pendulum member with respect to the base. When the pendulum member 42 is displaced rotationally from a position of rest, the flexure members provide a force tending to return it to the original position, and thus certain of the essential conditions for a mechanical oscillating system are present — a movable mass and a compliant suspension therefor.

For simplicity of illustration, in FIG. 4 only the essential elements of the base, pendulum and suspension members are shown. FIGS. 2 and 3 show the elements of FIG. 4 in assembled relation, and also show in greater detail how these elements may be embodied in a practical device.

Attached to the base 10 are upstanding metal posts 60 and 62, which are bifurcated at their upper ends to receive the ends of bimorph piezoelectric transducer elements 64 and 66. The latter elements extend parallel to the spring member 32 and are coupled to it by drive rods 68 and 70. Attachment of the rods to the piezoelectric elements and to the spring can be by a flexible cement, indicated at 72.

FIG. 5 is an enlarged view of the portion of the piezoelectric element 64 which is mounted in post 60. The transducer element 64 is a bimorph, consisting of piezoelectric plates 74 and 76, sandwiched with metallic electrodes 78, 79 and 80. By being clamped or soldered in the bifurcated portion of the post 60, the outer electrodes 78 and 80 are in electrical contact therewith, and the metal post and base 10 thus constitute one terminal 77 for the piezoelectric element 64. A lead 81 is brought out from the electrode 79 to constitute the other terminal. The plates 74 and 76 are so oriented that when an electrical potential is applied between the "ground " connection 77, i.e., base 10, and the lead 81 to electrode 79, one plate will tend to increase in length and the other to shorten, thus causing the assembly to bend in the plane of the drawing. The element 66 will bend similarly. Such bending results in the application of force to the spring 32 through the drive rods 68 and 70, tending to bend the spring 32 and thus to move the pendulum in a rotational sense.

A construction is thereby provided wherein the pendulum member 42 can be started and maintained in oscillatory motion by a suitable pulsating or alternating electrical signal supplied to the electromechanical transducer elements. The suspended mechanical system has a natural resonant frequency, and will oscillate at the greatest amplitude (for a given amplitude of input signal) when the input signal has the same periodicity as that resonant frequency. A mechanical system of appropriate size for an automobile clock, for example with a pendulum member 42 having a diameter about 1.3 inch, can be made to have a resonant frequency of 40 Hz. To generate an electrical signal of this frequency, any of various well known means may be used. However, where frequency stability and small size are particularly important, the beat frequency oscillator shown in FIG. 2 of copending application Ser. No. 875,428 has a number of advantages, which are set forth in that application. A signal source is indicated generally as 43 in FIG. 1.

For most practical applications where it is desired to make use of the motion of the pendulum, an appropriate coupling device is necessary to convert the oscillatory motion into the motion desired. To enable the movement of the pendulum member to be utilized for operation of a clock mechanism, a leaf spring 82 is attached to the pendulum by an adjustable bracket 84. The spring carries a pawl tip 86 of wear-resistant material, which engages the periphery of a ratchet wheel 88. The pitch, i.e., the tooth spacing on the ratchet wheel is such that the normal amplitude of rotational oscillation of the pendulum will cause the pawl to traverse at least one tooth pitch, but not two. A drag pawl 90 prevents reverse movement of the wheel 88. Thus the ratchet wheel is advanced one tooth for each cycle of oscillation of the pendulum.

The ratchet wheel 88 is carried by a shaft 92, which in turn carries a pinion 94. The pinion drives a gear 96, the first in a train of conventional gearing, not shown, operating the clock hands 98 shown in FIG. 1. The assembly may be enclosed in a suitable housing or dust cover 100.

It will be observed that the dust cover needs to be only slightly larger than the rotary pendulum itself, since the pendulum, by reason of its shape and suspension, can enclose most of the elements necessary in connection with it.

In order to assure that excessive amplitude of movement of the pendulum will not advance the ratchet wheel by more than one tooth per oscillation, it may be advisable in some applications to provide stops limiting the rotation of the pendulum. Such an arrangement can be seen in FIG. 3, where the clamp block 102 by which the spring member 22 is attached to the face 52 of the wall portion 46, is of sufficient thickness that it can be slotted as at 104 to provide a spring leaf 106. A screw 108 is mounted in the wall portion 16 of the base and can be adjusted to provide a clearance space 111 which allows the desired amount of movement of the pendulum in one direction, until the tip 110 of the screw 108 bears against the spring leaf 106 as a limit stop.

For controlling movement limits in the opposite direction, a similar arrangement is shown at the top of FIG. 2 in dotted lines.

Where severe axial shock is anticipated as a feature of the operating environment, it may be advisable to provide brackets 112 and 114 which are attached to the wall portions 14 and 16 of the base and overhang the pendulum member 42 without contact therewith under ordinary operating conditions. The purpose of such brackets is to prevent axial movement of the pendulum relative to the base in excess of an amount which would cause permanent deformation of the flexural members.

Figure 6:
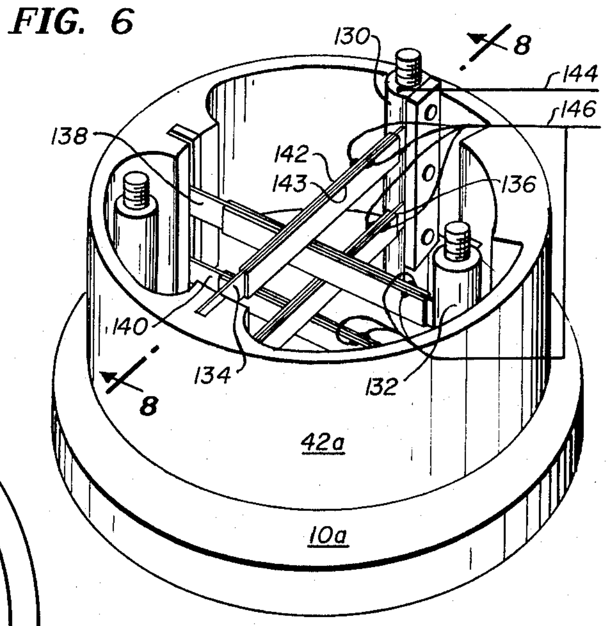
FIG. 6 is a perspective view illustrating another embodiment of the invention.
Figure 7:
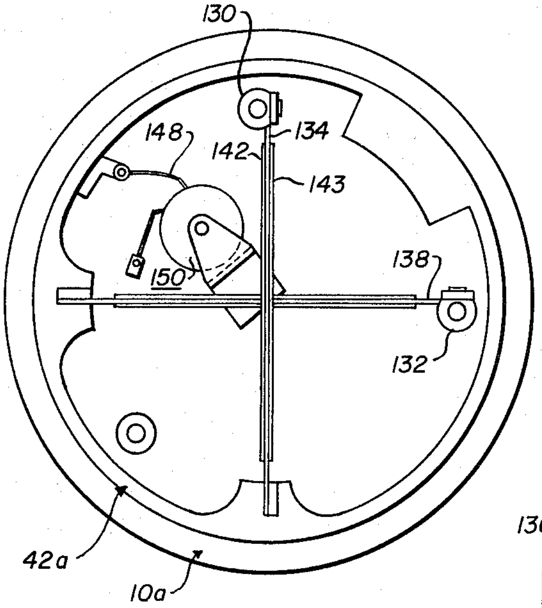
FIG. 7 is an elevation view of the embodiment of FIG. 6.
Figure 8:
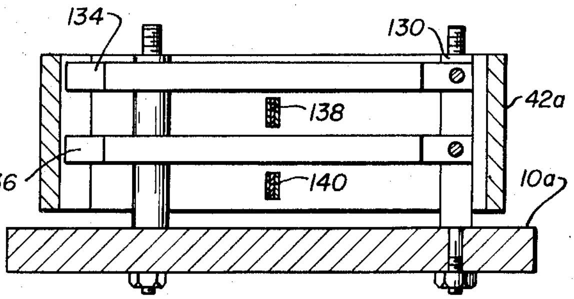
FIG. 8 is a sectional view taken on the line 8—8 of FIG. 6.

Another embodiment of the invention is shown in FIGS. 6, 7 and 8. In this case the rotary pendulum **42*a* is a complete cylindrical ring, which is suspended from metal posts 130 and 132 on the base 10*a* by crossed pairs of springs 134, 136 and 138, 140, attached to the pendulum and to the posts as shown. Piezoelectric elements such as 142 and 143 are laminated to the flat sides of each of the springs. Attachment to the springs may be by soldering, and this method has the advantage of providing electrical contact to the spring and thus to the supporting base 10*a*. However, attachment may be made by an adhesive such as epoxy cement, providing other arrangements are made for electrical contact to the inner surfaces of the piezoelectric elements. In the showing of FIG. 6, the inner electrodes of the piezoelectric elements are in contact with the springs and therefore electrically joined to all metallic elements common to the base 10*a*. One electrical terminal 144 is therefore shown as extending to the post 130. The outer electrodes of all the piezoelectric elements are connected in common and extended to a terminal lead 146. The piezoelectric elements are so oriented in their attachment to the springs that the application of a potential to the terminals 144 and 146 will deflect all piezoelectric elements and therefore their associated springs in such a way that all elements simultaneously are tending to rotate the pendulum in the same direction. Thus, by the application of an appropriately pulsed or alternating current signal to the terminals, the pendulum 42*a* can be kept in continuous oscillation. As in the case of the form of this invention first described, a mechanical output from the system may be obtained, as shown in FIG. 7, by a spring pressed pawl 148 driving a ratchet wheel 150** which in turn drives any desired associated instrumentation.

Figure 9:
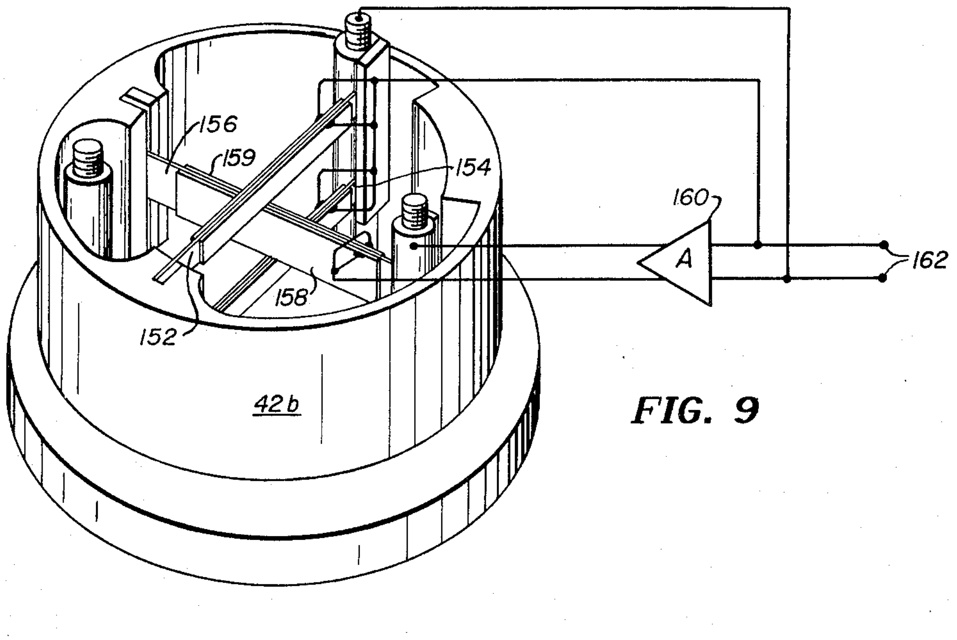
FIG. 9 is a perspective view showing still another form of the invention.

FIG. 9 shows another embodiment of the invention in which the pendulum member **42*b* is supported by two springs 152 and 154, and a single spring 156 at right angles thereto. Piezoelectric elements are attached to the three springs in the manner previously described. The mechanical system shown in FIG. 9 can be actuated in the same way as those described in FIG. 2 and FIG. 6, by the application of a pulsed or alternating current signal from an external oscillator or similar source. However, in FIG. 9 an electrical connection arrangement is shown in which an external oscillator is not required. The piezoelectric elements 158 and 159 on the spring 156 are connected to the input of an amplifier 160, and the output of the amplifier is connected to the piezoelectric elements on the springs 152 and 154**.

The gain of the amplifier assures a net input of energy to the system, and must be made sufficient to maintain it in oscillation. The oscillation will be at the natural frequency of resonance of the pendulum and its suspension. For most efficient operation, the amplifier should have circuitry which will give proper phase relations between input and output signals, as set forth in the copending application previously referred to.

As with the other versions of the invention, the FIG. 9 form may be used for mechanical output by the addition of a ratchet drive such as that shown in FIG. 2 or FIG. 6. However, it should be noted that as illustrated in FIG. 8 the system comprises a complete electromechanical oscillator, and thus it may be utilized for its electrical signal output, as found at the terminals 162. The frequency of this signal is quite rigorously controlled by the characteristics of the mechanical system.

Previous mention has been made of the fact that the high Q characteristics which can be attained in the mechanical system render it relatively insensitive to several types of external disturbances. These include the common transients in automotive electrical power circuits, and the vibration and shock conditions ordinarily encountered. Vibration environments having a rotational component which would affect the periodicity of the pendulum are believed to be uncommon.

In addition, the structural arrangement disclosed lends itself to a design whereby the resonant frequency can be maintained essentially constant over a considerable temperature range. For example, if the pendulum **42*b*** is formed from a material having a positive coefficient of expansion, its diameter, and therefore its moment of inertia, will increase with increasing temperature, thus tending to lower the resonant frequency. To offset this factor one chooses a material for the springs having a positive temperature coefficient of modulus of elasticity so that the springs become stiffer with increasing temperature, which tends to raise the resonant frequency. By suitable choices of the sign and magnitude of these characteristics of the materials, the two factors can be balanced over a reasonably wide temperature range, to attain substantial constancy of the natural period of resonance.

The foregoing description of the present invention as it relates to the design and use of the improved electromechanical oscillator contemplated thereby is only illustrative of specific forms which the present invention may take. Still other modifications and variations will suggest themselves to persons skilled in the art. It is intended, therefore, that the foregoing detailed description be considered as exemplary only and that the scope of the invention be ascertained from the following claims.

I claim:

1. In a rotary resonant drive system wherein a movable member is supported on and arranged for rotational oscillation with respect to a base, the improvement consisting of
first and second flexural means,
said first flexural means including a first elongated planar member
attached at one end to said base
and at the other end to said movable member, and
said second flexural means including a second elongated planar member
attached at one end to said base,
extending therefrom in a plane substantially perpendicular
to the plane of said first elongated
flexural member, and
attached at its other end to said movable member,
said first and second flexural means
providing support for said movable member with respect to said base and
providing a restoring torque when said movable member is rotationally displaced from a position of rest with respect to said base,
drive means
coupled to at least one of said flexural means and periodically imparting forces thereto
which tend to cause bending of at least one of said elongated members with respect to said base,
and a mechanical coupling
adapted to convert the resulting oscillatory rotational movement of said movable member into substantially unidirectional rotary motion.

2. The invention in accordance with claim 1, wherein said drive means includes a piezoelectric element.

3. The invention in accordance with claim 1, wherein said drive means includes an elongated piezoelectric element mounted at one end on said base, and coupled at its other end to said one of said elongated flexible members.

4. The invention in accordance with claim 1, wherein said drive means includes a piezoelectric element laminated to said one of said elongated flexible members.

5. The invention in accordance with claim 1, wherein said coupling includes a ratchet wheel, and a pawl driven by said movable member and operably engaging said ratchet wheel.

6. The invention in accordance with claim 1, wherein said movable member and said first and second flexural means constitute a system having a natural periodicity of rotational oscillation, and the period at which said drive means imparts forces to said one of said flexural means corresponds to said natural periodicity.

7. The invention in accordance with claim 1, wherein the amplitude of oscillatory rotary movement of said movable member is limited by engagement against spring stop means.

8. In an electromechanical oscillator system wherein a movable member is supported on and arranged for rotational oscillation with respect to a base, the improvement consisting of
first and second flexural means,
said first flexural means including a first elongated planar member
attached at one end to said base
and at the other end to said movable member, and
said second flexural means including a second elongated planar member
attached at one end to said base,
extending therefrom in a plane substantially perpendicular
to the plane of said first elongated
flexural member, and
attached at its other end to said movable member,
said first and second flexural means
providing support for said movable member with respect to said base and
providing a restoring torque when said movable member is rotationally displaced from a position of rest with respect to said base and
having a first electromechanical transducer
coupled to at least one of said flexural means and
tending to cause bending thereof when electrically energized,
a second electromechanical transducer
coupled to another of said flexural means and
having an electrical potential induced therein when bending of said another flexural means occurs,
and an amplifier, said first transducer being connected to the output of said amplifier, and said second transducer being connected to the input of said amplifier.

9. The invention in accordance with claim 8, wherein the transducers are piezoelectric elements.

10. The invention in accordance with claim 8, in which the transducers are piezoelectric elements laminated to said planar members.

* * * * *